(12) United States Patent
Lindén et al.

(10) Patent No.: US 8,136,252 B2
(45) Date of Patent: Mar. 20, 2012

(54) CUTTING TOOL

(75) Inventors: Olavi Lindén, Billnäs (FI); Markus Paloheimo, Helsinki (FI)

(73) Assignee: Fiskars Brands Finland Oy AB, Billnas (FI)

( * ) Notice: Subject to any disclaimer, the term of this patent is extended or adjusted under 35 U.S.C. 154(b) by 576 days.

(21) Appl. No.: 12/300,099

(22) PCT Filed: May 8, 2007

(86) PCT No.: PCT/FI2007/050255
§ 371 (c)(1),
(2), (4) Date: Mar. 10, 2009

(87) PCT Pub. No.: WO2007/128879
PCT Pub. Date: Nov. 15, 2007

(65) Prior Publication Data
US 2009/0217534 A1 Sep. 3, 2009

(30) Foreign Application Priority Data

May 9, 2006 (FI) .................................. 20065304

(51) Int. Cl.
*B26B 17/02* (2006.01)
(52) U.S. Cl. ................ 30/192; 30/254; 30/341
(58) Field of Classification Search ......... D8/5; 30/192, 30/211, 244, 245, 250, 252, 254, 341, 342, 30/351; 81/348, 359, 360, 364, 366; 7/129–134
See application file for complete search history.

(56) References Cited

U.S. PATENT DOCUMENTS

| 107,577 A * | 9/1870 | Will | 30/250 |
| 157,610 A * | 12/1874 | King | 30/192 |
| 476,459 A * | 6/1892 | Hamann et al. | 30/252 |
| 573,548 A * | 12/1896 | Sours | 30/192 |
| 640,257 A * | 1/1900 | Baer | 30/252 |
| 823,367 A * | 6/1906 | Ryan | 30/192 |
| 863,111 A * | 8/1907 | Smohl | 30/192 |
| 1,066,675 A * | 7/1913 | Stowell | 30/192 |
| 1,168,125 A * | 1/1916 | Stowell | 30/192 |
| 1,429,792 A * | 9/1922 | Stiriss | 30/192 |
| 1,455,297 A * | 5/1923 | Lyons et al. | 30/192 |
| 1,502,191 A * | 7/1924 | Helwig | 30/192 |

(Continued)

FOREIGN PATENT DOCUMENTS

EP 747181 A1 * 12/1996

(Continued)

OTHER PUBLICATIONS

Finnish Search Report for Finnish Application No. 20065304, Apr. 2, 2007 (2 pgs.).

(Continued)

*Primary Examiner* — Jason Daniel Prone
(74) *Attorney, Agent, or Firm* — Foley & Lardner LLP

(57) ABSTRACT

A cutting tool includes a first handle, a second handle, a first cutting blade attached to the first handle at a first pivot point, and a second cutting blade attached to the second handle at a second pivot point. The first and the second cutting blades are engaged with one another at a pivot point for movement in a scissor-like manner between an open position and a closed position in response to rotational movement of the first and the second handles. The first handle includes a first toothed transmission part and the second handle includes a second toothed transmission part, the first and the second toothed transmission parts being arranged to be engaged with one another.

15 Claims, 2 Drawing Sheets

U.S. PATENT DOCUMENTS

| | | |
|---|---|---|
| 1,520,529 A | 12/1924 | Cagle |
| 1,533,039 A | 4/1925 | Shirk |
| 1,689,648 A * | 10/1928 | Voleske ............................ 30/191 |
| 1,760,627 A * | 5/1930 | Bernard ............................ 30/192 |
| 1,771,031 A | 7/1930 | Court |
| 1,897,532 A * | 2/1933 | Pilcher ............................ 30/192 |
| 2,516,946 A * | 8/1950 | Barone ............................ 30/245 |
| 2,528,816 A | 11/1950 | Boyer |
| 2,557,506 A | 6/1951 | Kovacevich |
| 2,674,796 A | 4/1954 | Herold |
| 2,769,237 A | 11/1956 | Oxhandler |
| 3,760,500 A | 9/1973 | Eads et al. |
| 4,031,621 A | 6/1977 | Arlett |
| 4,046,148 A | 9/1977 | Meador |
| 4,130,938 A * | 12/1978 | Uhlmann ........................ 30/192 |
| 4,528,707 A | 7/1985 | Aida |
| 4,599,795 A * | 7/1986 | Yokoyama ...................... 30/192 |
| 4,677,748 A * | 7/1987 | Kobayashi ...................... 30/250 |
| D301,537 S | 6/1989 | Pittaway |
| D301,538 S | 6/1989 | Pittaway |
| D305,090 S | 12/1989 | Collins et al. |
| 4,947,553 A | 8/1990 | Bendickson et al. |
| 4,964,216 A | 10/1990 | Gosselin |
| 5,020,222 A | 6/1991 | Gosselin et al. |
| 5,079,801 A | 1/1992 | Peterson |
| 5,084,975 A | 2/1992 | Melter |
| D336,222 S | 6/1993 | Wensley et al. |
| D336,412 S | 6/1993 | Wensley et al. |
| D336,835 S | 6/1993 | Lutzke |
| 5,241,752 A | 9/1993 | Lutzke et al. |
| 5,255,438 A | 10/1993 | Morgan |
| D342,652 S | 12/1993 | Wensley et al. |
| 5,267,400 A | 12/1993 | Danube et al. |
| D343,773 S | 2/1994 | Lutzke |
| D344,220 S | 2/1994 | Wensley et al. |
| D347,771 S | 6/1994 | Lutzke |
| 5,367,774 A | 11/1994 | Labarre et al. |
| 5,426,857 A | 6/1995 | Lindén |
| 5,469,625 A | 11/1995 | Melter et al. |
| 5,570,510 A | 11/1996 | Lindén |
| 5,592,743 A | 1/1997 | Labarre et al. |
| 5,689,888 A | 11/1997 | Lindén |
| 5,697,159 A | 12/1997 | Lindén |
| 5,933,965 A | 8/1999 | Lindén et al. |
| 5,950,315 A | 9/1999 | Lindén |
| 5,974,670 A | 11/1999 | Hsieh |
| 6,101,725 A | 8/2000 | Lindén |
| 6,105,257 A | 8/2000 | Rutkowski et al. |
| 6,161,291 A * | 12/2000 | DiMatteo et al. ............... 30/192 |
| 6,199,284 B1 | 3/2001 | Nilsson et al. |
| 6,202,310 B1 | 3/2001 | Lindén |
| 6,345,446 B1 * | 2/2002 | Huang ............................ 30/250 |
| 6,418,626 B1 | 7/2002 | Jang |
| 6,493,943 B1 | 12/2002 | Linden |
| 6,513,248 B2 | 2/2003 | Linden et al. |
| 6,711,820 B2 | 3/2004 | Chen |
| 6,748,663 B2 | 6/2004 | Lindén |
| 6,785,969 B2 | 9/2004 | Wang |
| 6,789,324 B2 | 9/2004 | Lindén et al. |
| 6,829,828 B1 | 12/2004 | Cech et al. |
| 6,829,829 B1 * | 12/2004 | Huang ............................ 30/252 |
| D501,379 S | 2/2005 | Lipscomb et al. |
| D503,595 S | 4/2005 | Lipscomb et al. |
| 6,935,031 B1 * | 8/2005 | Huang ............................ 30/250 |
| 6,938,346 B1 * | 9/2005 | Huang ............................ 30/250 |
| 7,080,455 B1 | 7/2006 | Ronan et al. |
| 7,127,819 B1 * | 10/2006 | Huang ............................ 30/251 |
| D576,011 S | 9/2008 | Lipscomb et al. |
| 7,530,172 B1 * | 5/2009 | Wu ................................ 30/245 |
| 7,681,318 B2 * | 3/2010 | Hsieh ............................. 30/252 |
| D621,234 S * | 8/2010 | Goetz et al. ....................... D8/5 |
| 2001/0005941 A1 * | 7/2001 | DiMatteo et al. ............... 30/252 |
| 2002/0046466 A1 * | 4/2002 | Deville ........................... 30/254 |
| 2002/0066188 A1 * | 6/2002 | Wu ................................ 30/250 |
| 2003/0014868 A1 | 1/2003 | Cech et al. |
| 2005/0172499 A1 | 8/2005 | Huang |
| 2006/0156554 A1 * | 7/2006 | Lin ................................. 30/341 |
| 2006/0277764 A1 * | 12/2006 | Hsien ............................. 30/245 |
| 2008/0052916 A1 * | 3/2008 | Lin ................................. 30/249 |
| 2008/0155835 A1 * | 7/2008 | Lin ................................. 30/252 |
| 2008/0276464 A1 | 11/2008 | Hatch |
| 2008/0282549 A1 * | 11/2008 | Lin ................................. 30/194 |
| 2009/0044412 A1 | 2/2009 | Hsieh |
| 2010/0043237 A1 * | 2/2010 | Linden et al. ................... 30/250 |
| 2010/0043238 A1 * | 2/2010 | Linden et al. ................... 30/251 |
| 2010/0162575 A1 * | 7/2010 | Lin ................................. 30/245 |
| 2010/0199502 A1 * | 8/2010 | Linden et al. ................... 30/249 |
| 2011/0154668 A1 * | 6/2011 | Liu et al. ........................ 30/252 |

FOREIGN PATENT DOCUMENTS

| | | | |
|---|---|---|---|
| EP | 1153713 A1 * | 11/2001 | |
| EP | 1166620 A1 * | 1/2002 | |
| EP | 1 625 784 A1 | 2/2006 | |
| EP | 2156730 A2 * | 2/2010 | |
| EP | 2156731 A2 * | 2/2010 | |
| FR | 2 825 573 A3 | 12/2002 | |
| GB | 605038 | 7/1948 | |
| GB | 2 375 500 A | 11/2002 | |
| GB | 2468665 A * | 9/2010 | |
| JP | 08331979 A * | 12/1996 | |
| JP | 11057243 A * | 3/1999 | |
| JP | 2002066168 A * | 3/2002 | |
| WO | WO 2007/128879 A1 | 11/2007 | |

OTHER PUBLICATIONS

PCT International Preliminary Report on Patentability for International Application No. PCT/FI2007/050255, date of completion of report Aug. 7, 2008 (5 pgs.).

PCT International Search Report for International Application No. PCT/FI2007/050255, date of mailing of the International Search Report Sep. 4, 2007 (3 pgs.).

\* cited by examiner

CUTTING TOOL

This application is a United States National Phase of International Patent Application No. PCT/FI2007/050255 filed May 8, 2007 which claims priority to Finland Application No. 20065304 filed May 9, 2006, the disclosures of which are hereby incorporated by reference in their entirety.

BACKGROUND OF THE INVENTION

The invention relates to a cutting tool according to claim 1, and particularly to a cutting tool comprising a first handle, a second handle, a first cutting blade fixedly attached to the first handle, as well as a second cutting blade fixedly attached to the second handle, the first and the second cutting blades being engaged with one another at a pivot point such that the first and the second cutting blades are movable in a scissor-like manner between an open position and a closed position in response to a relative rotational movement of the first and the second handles around the pivot point, and transmission means for transmitting power from the handles to the cutting blades. In the present context, cutting tool is used to refer to all cutting tools that produce a scissor-like movement. In the figures and the disclosed particular embodiment of the invention, the tool in question is hedge shears.

When hedge shears are used for cutting branches, the branches to be cut are gathered inside a sector defined by the cutting blades at the beginning of the cutting movement, when the cutting blades are in an open position. As the cutting movement progresses, most branches are cut using the outermost ends of the cutting blades, which is disadvantageous since at the outermost end of the cutting blades the cutting power is the lowest. Consequently, a user of the hedge scissors has to put in a greater effort in order to cut the branches by the outermost parts of the cutting blades. This results in inefficient cutting operation.

In most known devices, the cutting power remains constant over the entire cutting distance between the open position and the closed position. Thus, the cutting power remains the same between the beginning of the cutting movement, where the branches are gathered inside a sector between the cutting blades, and the end of the cutting movement, where the actual cutting takes place. Hence, the cutting movement is inefficient, since the process of gathering the branches inside the sector defined by the cutting blades requires considerably less power than that of actually cutting the branches.

Transmission and linkage systems are widely used in various cutters to enhance the cutting power. This often leads to an increased movement of the handles, which compels the user to take a wider grip than would otherwise be necessary. Although most cutters are capable of increasing the cutting power, they still produce a constant-remaining increased cutting force. However, systems also exist which produce a progressive cutting force, one such system being disclosed in European Patent No. 1 153 713 granted to the applicant, the publication disclosing hedge shears that are capable of producing a progressive cutting force. In these hedge shears, the transmission mechanism is provided such that the greatest force is produced when it is needed, i.e. towards the end of the cutting movement. This aforementioned patent discloses hedge shears comprising two pairs of inter-engaging toothed transmission parts in order to produce an increasing cutting force. These hedge shears comprise a first and a second handle, the first handle comprising a first handle transmission part and the second handle comprising a second handle transmission part. The hedge shears also comprise a first and a second cutting blade, the first cutting blade containing a first blade transmission part and the second cutting blade containing a second blade transmission part. The first and the second handle transmission parts as well as the first and the second blade transmission parts are mutually symmetrical. The hedge shears also comprise means for attaching the first handle to the first cutting blade and for attaching the second handle to the second cutting blade and means for attaching the first blade pivotally to the second cutting blade. In such a case, the teeth of the first handle transmission intermesh with the teeth of the first blade transmission and the teeth of the second handle transmission intermesh with the teeth of the second blade transmission in order to increase the cutting force when the blades move towards the closed position.

A problem with the above-described arrangement is that at least one of the transmission means are formed directly in a blade, which means that they are made of the same material as the blade. The blade, in turn, is most usually made of metal, which means that the transmission means provided in the blade are made of metal. It is a laborious procedure to work metal in order to provide such transmission means and, besides, metal is an expensive material, so transmission means, and thus hedge shears, are expensive to manufacture. Furthermore, transmission means formed directly in the blade easily allow branches to enter between the teeth of the transmission means during the cutting operation, which hinders or even prevents operation of the hedge shears.

BRIEF DESCRIPTION OF THE INVENTION

An object of the invention is thus to provide a cutting tool which enables the aforementioned problems to be solved. The object of the invention is achieved by a cutting tool according to the characterizing part of claim 1, which is characterized in that the transmission means comprise a third toothed transmission part and a fourth toothed transmission part provided in the third pivot point as well as a fifth toothed transmission part provided in the first handle and a sixth toothed transmission part provided in the second handle, the third toothed transmission part and the fifth toothed transmission part being arranged to be engaged with one another as well as the fourth toothed transmission part and the sixth toothed transmission part being arranged to be engaged with one another in order to transmit power from the handles to the cutting blades.

Preferred embodiments of the invention are disclosed in the dependent claims.

The idea underlying the invention is that a first cutting blade is pivotally attached to a first handle of the cutting tool at a first pivot point and a second first cutting blade is pivotally attached to a second handle of the cutting tool at a second pivot point. The first and the second cutting blades, in turn, are further attached to one another at a third pivot point. The third pivot point is provided with an engagement part which is fixed in relation to this third pivot point and which comprises a third and a fourth toothed transmission part. The first handle and the second handle are provided with a fifth and a sixth toothed transmission part such that the third and the fifth toothed transmission parts engage with one another and the fourth and the sixth toothed transmission parts engage with one another during use of the cutting tool in order to transmit power from the handles to the cutting blades. The handles may be further provided with guide means for guiding the relative movement between the handles and thus between the blades as well. The guide means thus engage the handles with one another, enabling a reciprocal movement therebetween in order to produce a scissor-like movement of the cutting blades.

When the cutting tool is used such that at the beginning the blades are in an open position, in which the ends of the blades are apart, a cutting movement is produced by applying a force to the handles, the force moving the handles towards one another. The movement of the handles and the force applied thereto are transmitted to the cutting blades by the transmission means, such that the cutting blades move towards a closed position, in which their ends meet, turning around the third pivot point in relation to one another. At the same time during this cutting movement the third and the fifth as well as the fourth and the sixth toothed transmission parts become engaged with one another, transmitting the force applied to the handles to the cutting blades. During the cutting movement, the first handle turns around the first pivot point in relation to the first cutting blade and the second handle turns around the second pivot point in relation to the second cutting blade and further, the cutting blades turn in relation to one another around the third pivot point, in which case the shape of the third, fourth, fifth and sixth toothed transmission parts as well as the mutual placing thereof together with the first, second and third pivot points enable the cutting power to be transmitted from the handles to the cutting blades. As described above, the toothed transmission parts turning in relation to the pivot points constitute a planetary gear system or planetary transmission, which preferably provides a cutting power transmission ratio from the handles to the cutting blades which changes during the cutting movement as the cutting blades move from the open position to the closed position. Preferably, this cutting power transmission ratio increases during the cutting movement when the cutting blades move towards the closed position. Such a progressive cutting power transmission enables the cutting force of the blades to be increased by two- or threefold or even more as compared with the force applied to the handles. The invention is not, however, restricted to a progressive cutting power transmission ratio, but power transmission may also be provided uniformly.

An advantage of the method and system according to the invention is that the transmission means do not have to be provided in the cutting blades, which means that they may be manufactured from a material less expensive than metal, e.g. from plastic or another castable material. In addition, it is possible to integrate the transmission means, i.e. the toothed transmission means, excluding a separate engagement part, into the handle, so that no separate parts are needed for these transmission means. In such a case, the number of parts of the cutting tool can be kept to a minimum, which further saves manufacturing costs.

BRIEF DESCRIPTION OF THE DRAWINGS

The invention is now described in closer detail in connection with preferred embodiments and with reference to the accompanying drawings, in which.

DETAILED DESCRIPTION OF THE INVENTION

Figure 1:
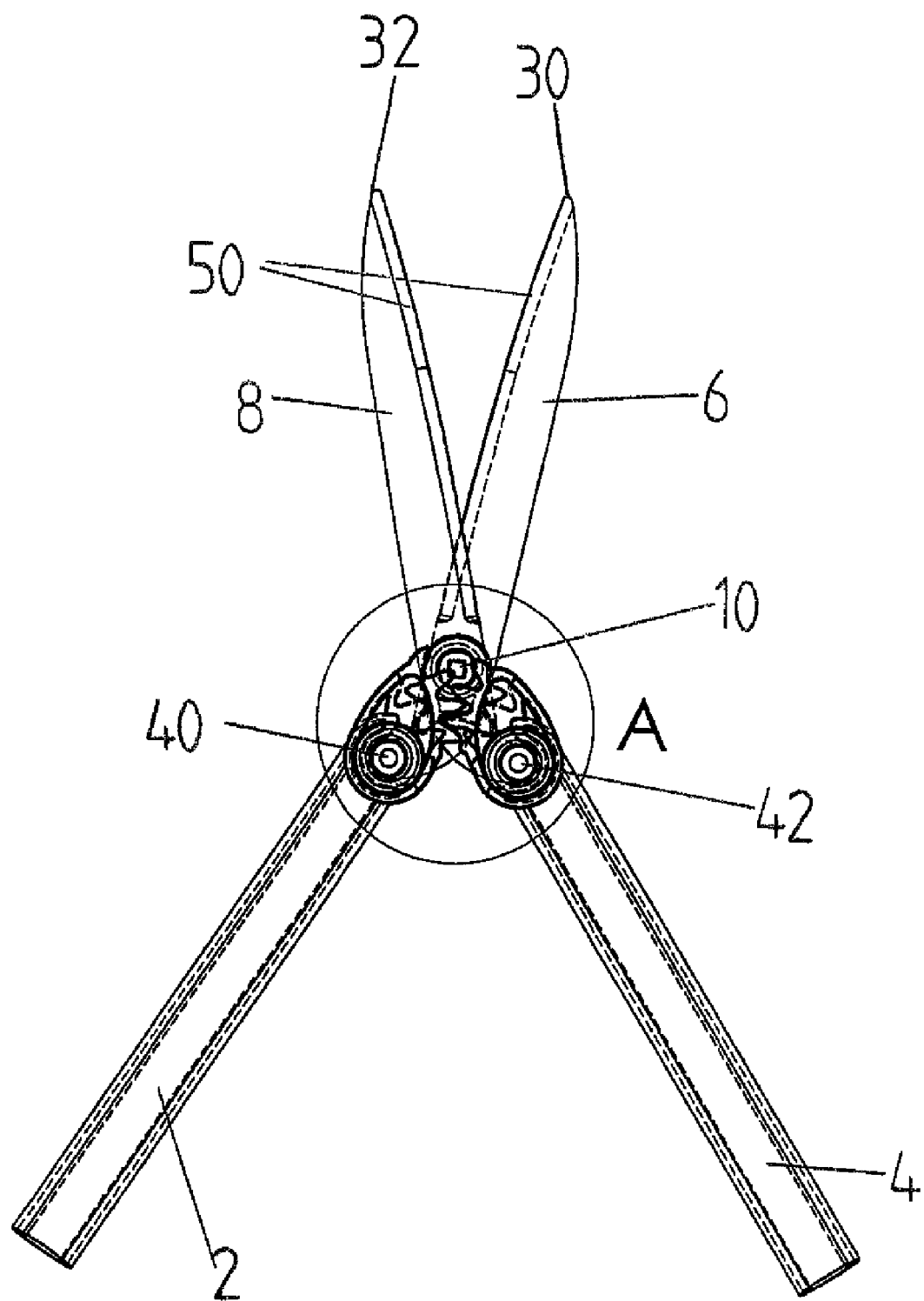
FIG. 1 shows a cutting tool according to the present invention.

FIG. 1 shows an embodiment of a cutting tool according to the present invention, which in this embodiment is hedge shears. These hedge shears comprise a first handle 2 and a second handle 4. The handles are generally straight, elongated parts and they may be made of steel, plastic, aluminium or any other material widely known in the art. Furthermore, the handles may comprise, preferably at their ends, a grip part which may be designed to fit the user's hand and provided with a friction-enhancing material, such as rubber. The hedge shears further comprise cutting blades 6 and 8, which are preferably made of steel or aluminium or another suitable material known in the art. The cutting blades 6 and 8 further comprise cutting edges 50.

According to FIG. 1, the first cutting blade 6 is attached to the first handle 2 at a first pivot point 40 and the second cutting blade 8 is attached to the second handle 4 at a second pivot point 42. The cutting blades 6 and 8 are thus pivotally attached to the corresponding handles 2 and 4 at the pivot points 40 and 42, respectively. Thus, it is possible to attach the first cutting blade 6 pivotally to the first handle 2 and the second cutting blade 8 to the second handle 4. A pivot pin, for instance, may be used as the attachment means such that the pivot pin is locked in place e.g. by a nut. Alternatively, any other similar attachment means which enables the cutting blade 6, 8 to turn in relation to a corresponding handle 2, 4 during the cutting movement of the hedge shears may be used for the attachment. The cutting blades 6 and 8 are further pivotally attached to one another at a third pivot point 10 by attachment means. In this embodiment, the attachment means used is a pivot pin, which attaches the cutting blades 6 and 8 pivotally or rotatably to one another. Instead of a pivot pin, any attachment means which allows the cutting blades to turn in relation to one another around the third pivot point 10 may be used as the attachment means at the third pivot point 10. Thus, the turning of the cutting blades 6 and 8 in relation to one another produces a scissor-like movement of the cutting blades 6 and 8 when the handles 2 and 4 are moved in relation to one another. In the arrangement according to FIG. 1, moving the handles 2 and 4 towards one another makes the cutting blades 6 and 8 move towards one another respectively when the cutting blades 6, 8 turn around the third pivot point 10, all the way to the closed position in which the cutting blades 6 and 8 as well their ends 30 and 32 meet. At the same time, the cutting blades 6, 8 also turn in relation to the corresponding handles 2, 4 around the pivot points 40, 42 such that during the cutting movement, the distance traveled by the handles is longer than that traveled by the cutting blades. Similarly, moving the handles 2 and 4 away from one another makes the cutting blades 6 and 8 and their ends 30 and 32 move apart, to an open position in which a sector or a gap opens up between the cutting blades 6 and 8, capable of receiving branches or the like to be cut.

Figure 2:
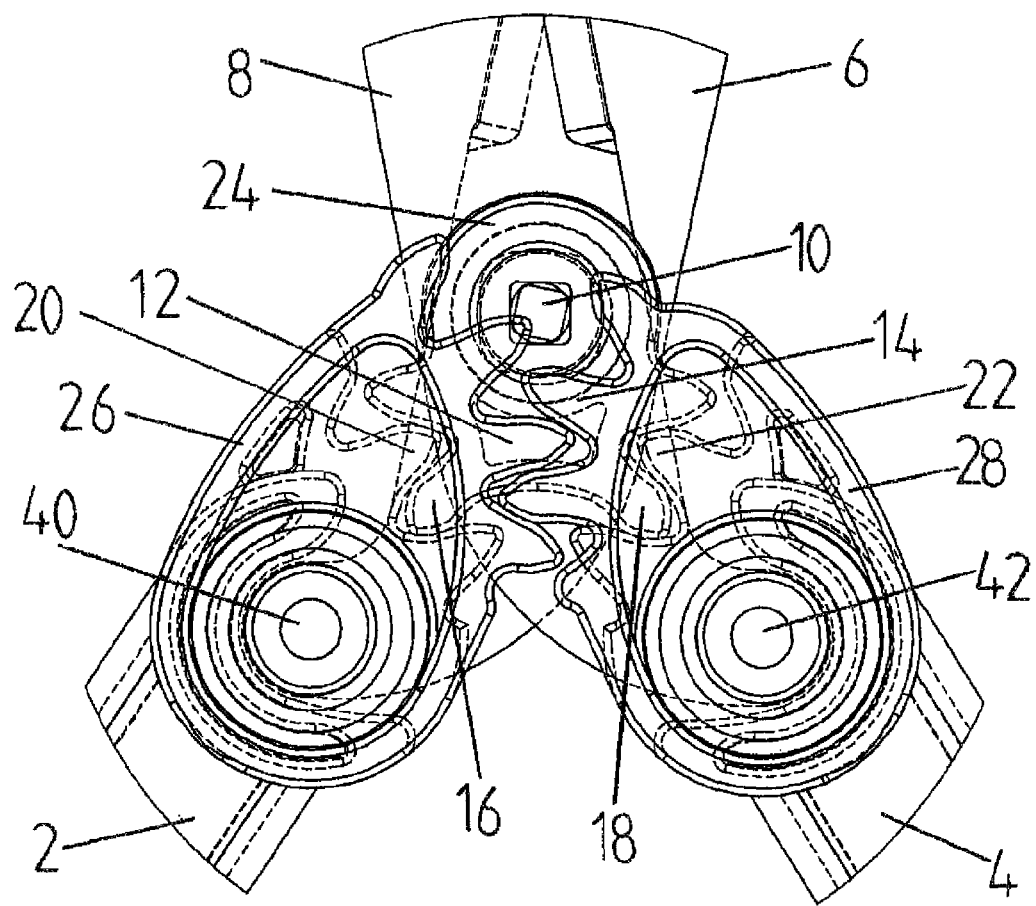
FIG. 2 shows an enlargement of section A of the cutting tool of FIG. 1.

FIG. 2 shows an enlargement of section A of FIG. 1. Both in FIG. 1 and FIG. 2, upper parts and outlines are shown in continuous lines while parts beneath these upper parts are shown in broken lines.

As shown in FIG. 2, which is an enlargement of section A of FIG. 1, the first handle 2 comprises a first transmission part 26 and the second handle 4 comprises a second transmission part 28. The first transmission part 26 comprises a first toothed transmission part or parts 12 and the second transmission part 28 comprises a second toothed transmission part or parts 14. In this embodiment, the first and the second transmission parts 26 and 28 are immovably attached to the first and the second handles 2 and 4, respectively. In other words, the first transmission part 26 does not move or turn in relation to the first handle 2; similarly, the second transmission part 28 does not move or turn in relation to the second handle 4. Hence, the first and the second transmission parts 26 and 28 do, however, turn in relation to the cutting blades 6, 8 during the cutting movement. When the hedge shears are used by providing the scissor-like movement of the cutting blades 6 and 8 by moving the handles 2 and 4 in relation to one another, the first toothed trans-mission part 12 of the first transmission part 26 as well as the second toothed transmission part 14 of the second transmission part 28 engage along with the movement of the handles 2 and 4 such that the teeth of the first and the second toothed transmission parts 12 and 14 intermesh with one another. Thus, the toothings of the first and the second toothed transmission parts 12 and 14 are designed to fit one another. The purpose of the transmission parts 26 and 28 is to engage the handles 2, 4 operatively with one another in order to guide the relative movement between the handles 2 and 4.

It is possible to make the transmission parts 26 and 28 integral parts of the handles 2 and 4, in which case they do not have to be separately attached to the handles 2 and 4. The number of parts to be manufactured can thus be further reduced. The transmission parts 26 and 28 as well as the toothed transmission parts 12 and 14 may be made of plastic, steel, aluminium or another suitable material, such as a castable material, and they may be designed according to the dimensions and desired properties of the hedge shears. The transmission parts 26 and 28 do not have to be as disclosed but they may be any parts which engage the handles operatively with one another in order to guide the movement therebetween.

According to FIG. 2, the third pivot point 10 is provided with an engagement part 24 comprising a third toothed transmission part 16 and a fourth toothed transmission part 18. The engagement part 24 is attached to the third pivot point 10 such that it is immovable in relation to the third pivot point 10 when the hedge shears are being used. In other words, the engagement part 24 does not turn around the third pivot point 10 when the hedge shears are being used. The engagement part 24 is attached to the pivot point by means of a pivot pin, so it does not necessitate any separate attachment means. The engagement part 24 may be made of plastic, steel, aluminium or another suitable material. Furthermore, the engagement part 24 may comprise one or more separate parts, in which case different parts may constitute the third and the fourth toothed transmission parts 16 and 18. The third and the fourth toothed transmission parts 16 and 18 may further be substantially similar in shape.

The first handle 2 is provided with a fifth toothed transmission part 20 and the second handle 4 is provided with a sixth toothed transmission part 22. According to FIGS. 1 and 2, the fifth and the sixth toothed transmission parts 20 and 22 are provided integrally in the handles 2 and 4, respectively. This means that they have been formed directly in the handles 2 and 4. Alternatively, they may be provided in separate transmission parts to be further fixedly attached to the handles 2 and 4. Thus, while the hedge shears are being used, these fifth and sixth toothed transmission parts 16, 18 turn in relation to the cutting blades 6, 8 as well as in relation to the engagement part 24. The toothed transmission parts 20 and 22 may be made of plastic, steel, aluminium or another suitable material, and preferably, due to the aforementioned reasons, they are mutually identical in shape.

When the hedge shears are used by providing the scissor-like movement of the cutting blades 6 and 8 by moving the handles 2 and 4 in relation to one another, the fifth and the sixth toothed transmission parts 16 and 18 move along with the movement of the handles 2 and 4 such that the third toothed transmission part 16 and the fifth toothed transmission part 20 of the engagement part 24 as well as the fourth toothed transmission part 18 and the sixth toothed transmission part 20 of the engagement part 24 move along with the movement of the handles 2 and 4 such that their teeth intermesh with one another. In such a case, the force applied to the handles 2, 4, which moves the handles 2, 4 towards one another, is transmitted to the cutting blades 6, 8 by means of the transmission means, i.e. the inter-engaging third toothed transmission part 16 and fifth toothed transmission part 20 as well as the fourth toothed transmission part 18 and the sixth toothed transmission part 22, to the cutting blades 6, 8, in which case the cutting blades 6, 8 move towards a closed position in which their ends meet, turning around the third pivot point in relation to one another. During the cutting movement, the first handle 2 turns around the first pivot point 40 in relation to the first cutting blade 6 and the second handle 4 turns around the second pivot point 42 in relation to the second cutting blade 8 and further, the cutting blades 6, 8 turn in relation to one another around the third pivot point 10, in which case the shape of the third 16, fourth 18, fifth 20 and sixth 22 toothed transmission part as well as the mutual placing thereof together with the first, second and third pivot points enable the cutting power to be transmitted from the handles to the cutting blades 6, 8. The power transmission system operates in relation to said three pivot points, wherein the transmission system thus provided constitutes a planetary gear system or planetary transmission, which preferably provides a cutting power transmission ratio from the handles to the cutting blades, the ratio changing during the cutting movement as the cutting blades move from the open position to the closed position. Preferably, this cutting power transmission ratio increases during the cutting movement as the cutting blades move towards the closed position. Such a progressive cutting power transmission enables the cutting force of the blades to be increased by two- or threefold or even more as compared with the force applied to the handles. The invention is not, however, restricted to a progressive cutting power transmission ratio, but power transmission may also be provided uniformly, in which case the toothed transmission parts 16, 18, 20, 22 transmitting power have the shape of e.g. circular arches and it is possible to use a circular toothed gear or a part thereof as the engagement part 24.

When the hedge shears as described above are used such that the cutting blades 6, 8 are moved from an open position, in which their ends 30, 32 are apart, towards a closed position, in which their ends 30, 32 meet, by moving the handles 2, 4 towards one another, the force applied to the handles is made to be transmitted to the cutting blades 6, 8 by means of the transmission means. As described above, these transmission means comprise a third, fourth, fifth and sixth toothed transmission parts 16, 18, 20, 22. When the blades turn around the pivot point 10, these transmission means transmit the force applied to the handles to the cutting blades 6, 8. The shape of the toothed transmission parts 16, 18, 20, 22 of the transmission means is such that during the cutting movement the cutting power of the blades increases in relation to the force applied to the handles as the cutting blades 6, 8 approach the closed position. According to the above, the transmission means provide an increase in the cutting power transmission ratio when the cutting blades 6, 8 approach the closed position. Preferably, this increase in the cutting power is, according to FIGS. 1 and 2, provided by cooperation of the third and the fifth toothed transmission part 16, 20 as well as the fourth and the sixth toothed transmission part 18 and 22 and the teeth transmissions and geometry thereof, so that the radii of the toothed transmission parts and the shape of the teeth change, preferably progressively, over the distance of the cutting movement. By the above-described arrangement, the cutting power of the cutting blades is increased by two- or threefold or even more as compared with the force applied to the handles.

In order to guide the mutual movement of the handles 2 and 4 as well as the cutting blades 6 and 8, the hedge shears are further provided with guide means which guide the relative mutual position of the cutting blades, and thus also of the handles, during the cutting movement. According to the present invention, these guide means are formed by the first and the second toothed transmission part 12, 14. The intermeshing teeth of these toothed transmission parts 12 and 14 keep the relative position of the cutting blades 6, 8, and thus also of the handles 2, 4, as desired over the entire distance of the cutting movement between the closed and open positions of the cutting blades. Preferably, the guide means enable the movement of the cutting blades 6, 8 and the handles 2, 4 to be symmetrical such that the cutting blades 6, 8, along with the handles 6, 8, turn around the pivot point 10 symmetrically.

In this embodiment, the guide means do not participate in power transmission, but the guide means may also be formed in such a manner that they as well contribute to the transmission of power from the handles to the cutting blades as described above. Thus, it is also possible to provide these toothed parts of the guide means such that they change the power transmission ratio when the blades are being opened from the closed position towards the open position, in which case the guide means would be used for power transmission when the aim is to open the blades by force. Consequently, when the handles are being opened, the toothing of the guide means would also force the blades to open.

Also other kinds of means capable of guiding the movement of the handles and the cutting blades may be used as the guide means. Examples of such guide means include an arch which is attached to the first handle, between its ends, and which extends between the first and the second handle. The second handle is further provided with a sleeve or another reception part enabling the arch to slide therein. It is also possible to use various self-adhesive and adhesion means as the guide means. This enables the relative movement between the cutting blades to be guided.

It is apparent to one skilled in the art that as technology advances, the basic idea of the invention may be implemented in many different ways. The invention and its embodiments are thus not restricted to the above-described examples but they may vary within the scope of the claims.

The invention claimed is:

1. A cutting tool comprising a first handle, a second handle, a first cutting blade attached to the first handle at a first pivot point, as well as a second cutting blade attached to the second handle at a second pivot point, the first and the second cutting blade being engaged with one another at a third pivot point such that the first and the second cutting blades are movable between an open position and a closed position in response to a relative rotational movement of the first and the second handles around the third pivot point, and a transmission for transmitting power from the handles to the cutting blades, wherein the transmission comprises a third toothed transmission part and a fourth toothed transmission part provided on an engagement part attached about the third pivot point so that the engagement part is immovable in relation to the third pivot point when first and second cutting blades are moved between the open position and the closed position, as well as a fifth toothed transmission part provided in the first handle and a sixth toothed transmission part provided in the second handle, the third toothed transmission part and the fifth toothed transmission part being arranged to be engaged with one another as well as the fourth toothed transmission part and the sixth toothed transmission part being arranged to be engaged with one another in order to transmit power from the handles to the cutting blades.

2. A cutting tool as claimed in claim 1, further comprising a guide for guiding movement between the first cutting blade as well as the second cutting blade and/or the first handle and the second handle.

3. A cutting tool as claimed in claim 2, wherein the guide comprises a first toothed transmission part provided in the first handle and a second toothed transmission part provided in the second handle, the first and the second toothed transmission parts being arranged to be engaged with one another for guiding movement between the first cutting blade as well as the second cutting blade and/or the first handle and the second handle.

4. A cutting tool as claimed in claim 3, wherein the first and the second toothed transmission parts are provided integrally in the first and the second handle, respectively.

5. A cutting tool as claimed in claim 2, wherein the guide is provided in the first and the second handles above a plane defined by the cutting blades.

6. A cutting tool as claimed in claim 5, wherein the third and the fourth and/or the fifth and the sixth toothed transmission parts are provided below the guide.

7. A cutting tool as claimed in claim 5, wherein the third and the fourth and/or the fifth and the sixth toothed transmission parts are provided above the plane defined by the cutting blades.

8. A cutting tool as claimed in claim 7, wherein the third and the fourth and/or the fifth and the sixth toothed transmission parts are provided below the guide.

9. A cutting tool as claimed in claim 1, wherein the fifth and the sixth toothed transmission parts are provided integrally in the first and the second handles, respectively.

10. A cutting tool as claimed in claim 1, wherein the third pivot point is provided with a pivot pin for engaging the first and the second blades pivotally directly to one another.

11. A cutting tool as claimed in claim 1, wherein the third and the fourth toothed transmission parts are disposed in a fixed relationship to the third pivot point when the cutting blades are moved between the open and the closed positions.

12. A cutting tool as claimed in claim 1, wherein the third and the fifth toothed transmission parts as well as the fourth and the sixth toothed transmission parts are established to provide a cutting power transmission ratio which changes during cutting movement when the cutting blades move from the open position to the closed position.

13. A cutting tool as claimed in claim 12, wherein the third and the fifth toothed transmission parts as well as the fourth and the sixth toothed transmission parts are established to provide a cutting power transmission ratio which increases when the cutting blades move from the open position towards the closed position, so that available power increases as the cutting blades approach one another.

14. A cutting tool as claimed in claim 1, wherein the first and the second handles and/or the first and the second cutting blades are identical in shape.

15. A cutting tool as claimed in claim 1, the third and the fourth toothed transmission parts and/or the fifth and the sixth toothed transmission parts are mutually similar.

* * * * *